Aug. 21, 1962 S. C. STRAUS 3,049,932
VARIABLE PITCH DRIVING SYSTEM
Original Filed Aug. 30, 1956 3 Sheets-Sheet 1

INVENTOR.
S. Charles Straus.
BY
Wood, Herron & Evans.
ATTORNEYS.

Aug. 21, 1962 S. C. STRAUS 3,049,932
VARIABLE PITCH DRIVING SYSTEM
Original Filed Aug. 30, 1956 3 Sheets-Sheet 2

INVENTOR.
S. Charles Straus.
BY
Wood, Herron & Evans.
ATTORNEYS.

Aug. 21, 1962 S. C. STRAUS 3,049,932
VARIABLE PITCH DRIVING SYSTEM

Original Filed Aug. 30, 1956 3 Sheets-Sheet 3

INVENTOR.
S. Charles Straus.
BY
Wood, Herron & Evans.
ATTORNEYS.

United States Patent Office 3,049,932
Patented Aug. 21, 1962

3,049,932
VARIABLE PITCH DRIVING SYSTEM
S. Charles Straus, Cincinnati, Ohio, assignor to Cincinnati Manufacturing Corporation, Cincinnati, Ohio, a corporation of Ohio
Original application Aug. 30, 1956, Ser. No. 607,137, now Patent No. 2,963,944, dated Dec. 13, 1960. Divided and this application Mar. 1, 1960, Ser. No. 20,794
2 Claims. (Cl. 74—230.17)

This invention relates to milling machines. It is directed particularly to a convertible machine tool adapted conveniently for use in vertical milling or drilling, horizontal milling or drilling or for service as a universal milling machine, for cutting helix grooves, angular surfaces or the like.

The present application is a division of the co-pending application of S. Charles Straus for Variable Pitch Driving System, Serial No. 607,137, filed August 30, 1956, now Patent No. 2,963,944.

The co-pending application, Serial No. 607,137 (now Patent No. 2,963,944) discloses a machine tool in which various types of machining operations just identified are combined with ease of convertibility from one type of operation to another and are combined with a degree of rigidity which is not heretofore been realized. In the past, milling machines which are essentially of the vertical milling machine type have been provided with demountable angle heads for use in horizontal milling, and horizontal type milling machines have been equipped with angle attachments for vertical milling service. However, the installation of conversion attachments is tedious and time consuming and at best, such attachments, when small enough to be lifted about manually, lack the rigidity which otherwise may be built into the main frame of the machine.

Milling machines essentially of the vertical type have been provided in which the tool spindle is angularly adjustable about a horizontal axis, whereby vertical or angular machining operations may be performed with a somewhat greater ease of convertibility. However, in such machines, the drive motor for the tool spindle is mounted at a level well above the work table, usually on the spindle head and this disposition of the relatively heavy driving motor inherently introduces vibrations which adversely affect the quality of the finish which the milling cutter is otherwise capable of producing.

In accordance with this invention, the machine tool comprises a column or base of the usual rugged construction suited to sustain the loads and dampen the vibrations which are incident to all milling operations. The upper portion of this base rotatably supports a turret which is movable through a horizontal plane. The base at one side carries the usual knee and table which is movable through conventional elements in coordinate directions, and the turret carries a horizontal spindle which is adapted to receive a tool in position overhanging the table for horizontal milling. The turret however, also contains a portion depending down into the frame for supporting drive gearing through which power is transmitted to the spindle. Part of this power gearing, in the preferred construction, includes bevel gears, one of which is disposed on the axis of rotation of the turret, whereby mesh therewith is maintained by the other of the bevel gear upon rotation of the turret to various positions in the horizontal plane. Thus, a suspension for the relatively heavy drive gears, at a level generally below the horizontal plane of support of the turret, counterbalances and provides rigidity from vibration for the horizontal milling spindle which is located on the turret at a level above the horizontal plane of support for the turret. Accordingly, high quality of machine finish is provided in conjunction with the ease of angular adjustment of the turret from one position to another horizontally over the table. The drive motor in the preferred construction, is mounted within the base in any manner suitable for effective rotation of the shaft on which is mounted the bevel gear aligned with the axis of rotation of the turret.

In addition, a portion of the turret which is radially displaced from, or which is diametrically opposite the horizontal spindle tool socket, is equipped with a self-contained vertical milling head whereby the mere rotation of the turret about its vertical axis enables the operator to bring the vertical tool socket or the horizontal tool socket to the point of use over the table as desired.

In the preferred construction, the turret, at a level above the horizontal spindle which it carries, is equipped with a slidable overarm on which the vertical milling head and its independent drive motor are mounted. The portion of the overarm which is opposite the vertical milling head, projects beyond the horizontal spindle socket and carries a depending outboard bearing for a shaft or arbor on which the horizontal milling cutter may be mounted. Thus, the weight of the drive gearing for the horizontal milling shaft provides a low center of gravity which stabilizes the entire machine during either vertical or horizontal milling operations. Similarly, for helical gear cutting or the like, the turret may be indexed to the necessary angular positions over the table, which permits a simplified and rigid table mounting to be employed.

The self-contained vertical milling head noted above, does not form a part of the present invention and is disclosed in my co-pending application Serial No. 609,754, filed on September 13, 1956, now Patent 3,013,473.

The present machine, as desired, may be equipped with locks for fixing the turret in any position of use to which it has been rotated or indexed and also with a power drive for rotating the turret from one position of use to the other more rapidly or with greater ease than by manual effort. These features thus enable the machines of the present invention conveniently to provide horizontal, vertical, angular, or universal milling service with the degree of rigidity that has heretofore been provided only in single purpose machines and with little loss of time in effecting conversion from one type of machine operation to another.

A primary objective of the present invention has been to provide an improved transmission system for driving the horizontal spindle of the turret at selected speeds. The transmission system utilizes in combination, a belt driving system and gear train mounted in the head, driven by the centralized bevel gear drive of the turret. The main motor of the column drives through a variable pitch pulley system which provides infinitely variable spindle speeds by hand wheel adjustment. These individual selective speeds are divided into two speed ranges by the turret gear train which is selectively shifted to a high or low range. A spindle speed indicator is in driving connection with the mechanism which shifts the variable pitch pulley system to provide direct indication of the selective spindle speeds in the high or low range.

Further advantages and features of the machine of the present invention appear in the following detailed description of the drawings in which a typical embodiment of the invention is illustrated.

General Arrangement

Figure 1:
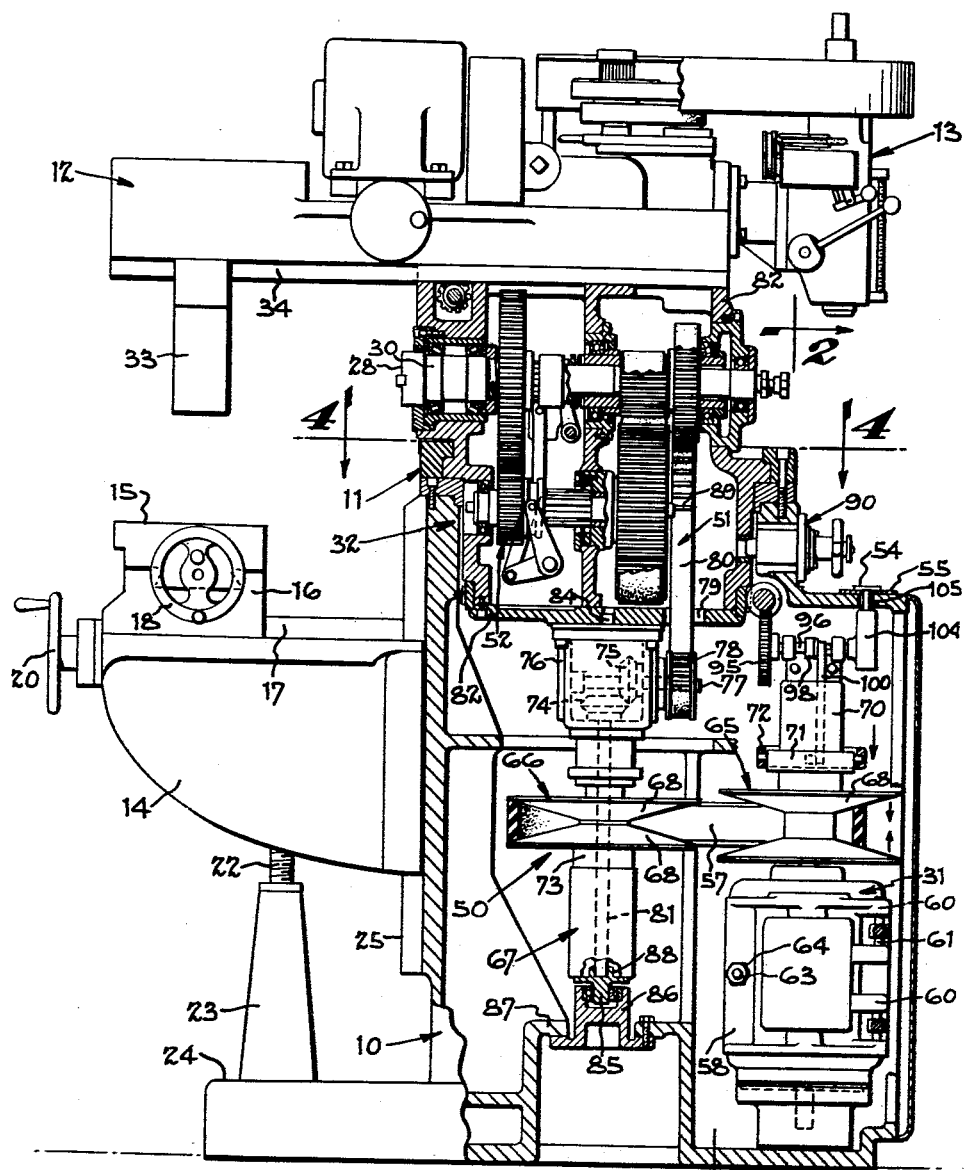
FIGURE 1, is a fragmentary vertical section of a milling machine incorporating the variable pitch driving system of the present invention.
Figure 2:
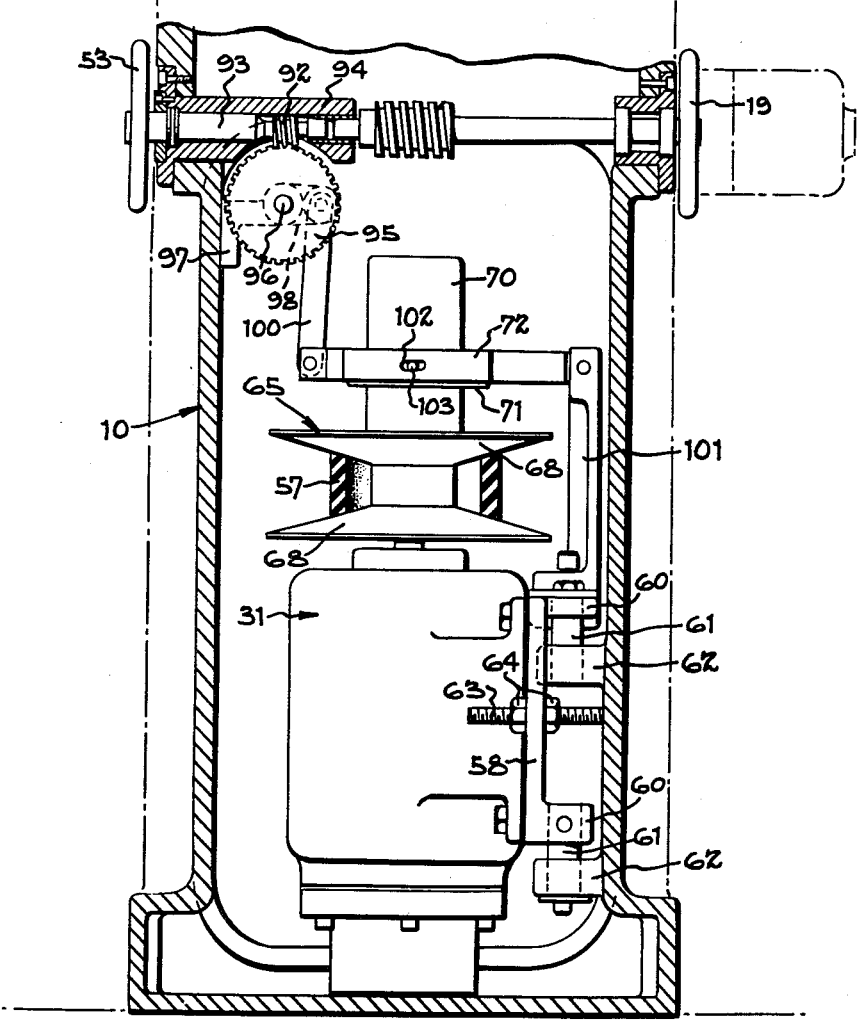
FIGURE 2 is an enlarged fragmentary sectional view of the variable pitch pulley system, taken along the lines 2—2 of FIGURE 1.

Described generally with reference to FIGURES 1 and 2, the milling machine comprises a hollow, box-like, column 10 having at its upper end a turret 11 which may be indexed about a vertical axis in setting up the machine for the various milling operations. Mounted on the top of the turret is a slidable overarm 12 which carries an angularly adjustable, vertical milling head 13. A knee 14 is slidably mounted at the front of the column for vertical adjustment, and a horizontal work table 15 is mounted upon a saddle 16 for longitudinal motion with respect to the knee. The saddle, in turn, is slidably mounted for transverse motion upon a dovetail slideway 17 formed on the upper surface of the knee.

The table includes a longitudinal feed screw which may be rotated from either end by means of the hand wheels 18, or by a power feed mechanism (not shown). The saddle and table are shifted as a unit transversely by a cross feed screw (not shown) rotatably journalled in the knee and rotated by the hand wheel 20. The knee and table is adjustable vertically by a crank (not shown) in driving connection with a knee elevating mechanism (not shown) which includes the vertical elevating screw 22. The elevating screw rises from a pedestal 23 supported upon the forwardly extended base portion 24 of the column. For vertical movement, the knee is carried by the vertical slideway 25 formed on the front of the column.

The table feed mechanism and knee construction do not form a part of the present invention and have been omitted from the disclosure.

Variable Speed Transmission Generally

The horizontal spindle 30 is driven by the main motor 31 through a variable pitch pulley system and transmission 32 at infinitely variable spindle speed (FIGURE 1). In the present example, the pulley system and transmission provide spindle feeds in two ranges: the first range consists of speeds from 29 r.p.m. to 200 r.p.m. and the second range consists of speeds from 200 r.p.m. to 1450 r.p.m. The spindle drive in the low speed range (29 r.p.m. to 200 r.p.m.) is by way of the main motor 31, variable pitch pulley system 50, timing belt drive 51, and gear train 52, as shown in FIGURE 1. The high speed range (200 r.p.m. to 1450 r.p.m.) is obtained by uncoupling the gear train 52 and driving the spindle directly through the variable pitch pulley system 50 and timing belt drive 51, thus by-passing the gear train 52.

In both spindle speed ranges, the speeds are selected simply by rotating the hand wheel 53 (FIGURE 2) which changes the pitch of the main motor pulley system. This mechanism is described in detail later. The selected spindle speed is denoted by a pointer 54 (FIGURE 4) which moves with reference to the graduations carried by a speed indicator plate 55. This plate is divided into two sections, one section showing the low speed range and the other high speed range.

The two speed ranges are selected by the range selector lever 56 (FIGURE 4) which is selectively shifted in two positions for the high or low speed range. This lever is connected to a cam and link system which couples or uncouples the low speed gear train 52 as explained later. The transmission is shown in its low speed range in FIGURE 1.

Variable Pitch Pulley System

Referring to FIGURE 1, the main motor 31 which drives the horizontal spindle through the variable pitch pulley system 50 is mounted in the lower portion of column 10. For the purpose of keeping the driving belt 57 taut, motor 31 is bolted to a hinged base 58 having lugs 60 carried upon pivot pins 61 which are supported on lugs 62 projecting from the column wall. Belt adjustment is obtained by a jack screw 63 (FIGURE 2) passing through the swing end of the hinged plate 58 and locked by the nuts 64. The end of the jack screw engages the wall of the column and, upon being adjusted, swings the motor in a direction to tighten belt 57.

The variable pitch drive 50 comprises the motor pulley 65 mounted on the shaft of the main motor 31 and a driven pulley 66, which is mounted upon an intermediate shaft assembly 67, the two pulleys being connected by the belt 57. The two variable pitch pulleys are of conventional design and their exact construction therefore has been omitted. In general, each pulley comprises a pair of separable disk-like flange sections 68, each pair delineating a generally V-shaped traction pulley engaging the belt.

The sections of the motor pulley are carried by axially shiftable sleeves 70. These sleeves are relatively shifted by operation of the speed change mechanism under the control of the hand wheel 53 (FIGURE 2) noted earlier. For this purpose, the upper sleeve 70 includes a shifter ring 71 engaged by a yoke lever 72. The sections of the driven pulley 66 likewise are carried by shiftable sleeves as indicated at 73.

The apparatus is shown in its low speed adjustment in FIGURE 1, the motor pulley being adjusted to its small pitch and the driven pulley correspondingly shifted to its maximum pitch. The speed change hand wheel 53 is rotated while the motor is running; thus, as the sleeves 70 of the motor pulley are shifted toward one another, as indicated by the arows, the effective pitch of the motor pulley is increased. The sections of the driven pulley, in the usual way, separate in response to the pitch change of the motor pulley, and at the limit of high speed adjustment, the positions of the pulley sections are reversed from that shown in FIGURE 1.

The drive from the intermediate shaft assembly 67 (FIGURE 1) to the spindle transmission 32 is by way of the right angle bevel gear train, consisting of bevel gears 74 and 75 enclosed by gear box 76 which is bolted directly to the bottom of the turret housing 82, and centered by a dowel 84. Bevel gear 75 is mounted upon a cross shaft 77 which drives a timer gear 78 meshing with a timer belt 80 extending through a slot 79 to the spindle transmission. Bevel gear 74 is attached to the end of a vertical shaft 81 having its upper end journalled in gear box 76, the vertical shaft being driven by pulley 66. The timer belt 80 is conventional and is fabricated from a pliable material including teeth 89 mashing with the teeth of gear 78 to provide a positive driving connection with the spindle transmission within the turret housing.

Figure 4:
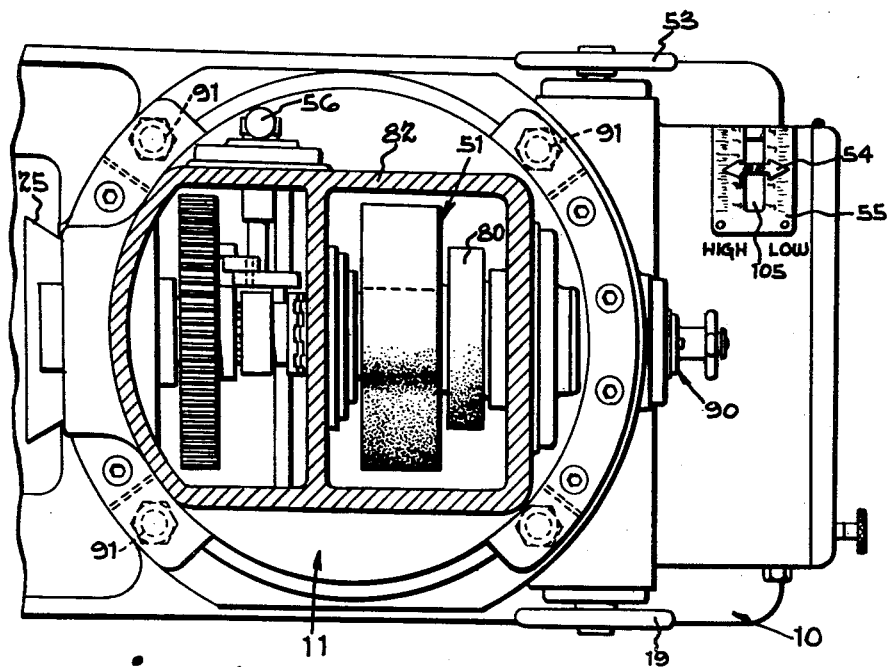
FIGURE 4 is a sectional view taken along line 4—4 of FIGURE 1, further detailing the gear and belt transmission which drives the horizontal spindle.

The intermediate shaft assembly 67 and gear box 76 form a composite unit coaxial with the turning axis of the turret housing 82 and suspended from it; therefore, the gear box and shaft assembly turn with the turret housing during the indexing motion. Since bevel gear 74 is concentric to the turning axis of the turret, its companion gear 75 is free to change its radial position in relation to gear 74 without creating any interference. As shown in FIGURE 1, the lower end of shaft assembly 67 includes a pilot shaft 85 journalled in a ball bearing which is seated in a cup 86. The cup is bolted to the top flange of a mounting box 87 rising from the bottom of column 10. It will be noted that the lower end of the central shaft 81 of the shaft assembly is journalled in a bearing 88 coaxial with the pilot shaft 85. Since the torque is transmitted by shaft 81, it tends to rotate the turret housing 82. To overcome the turning force, the turret housing is locked in selected position by the plunger assembly indicated at 90 in FIGURES 1 and 4 when in right angular position above the table and by clamping studs 91 (FIGURE 4). The turret may be indexed whether the main motor is running or not by virtue of the coaxial arrangement of shaft assembly 67, as noted earlier. When it is necessary to index the turret from the right angular position, the plunger is disengaged, the clamping studs 91 are released, then the turret and its overarm are rotated by means of the indexing hand wheel 19 or by a motor as described later.

Figure 3:
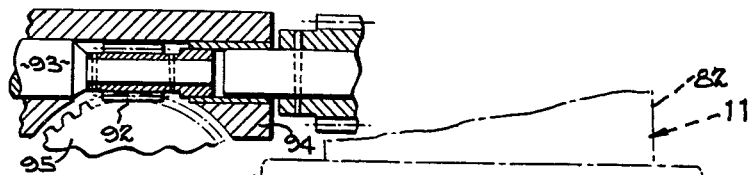
FIGURE 3 is an enlarged fragmentary view taken from FIGURE 2, further detailing the speed change system.

Referring to FIGURES 1 to 3, the mechanism for changing the pitch of motor pulley 65 comprises a worm 92 pinned to the shaft 93 of the speed change hand wheel 53. The shaft and worm are rotatably journalled in a sleeve 94 projecting inwardly from the column wall. Worm 92 meshes with a worm wheel 95 keyed to a rock shaft 96 journalled in bracket 97 which is attached to the column wall. Secured to rock shaft 96 is a lever 98 having its outer end pivotally connected by a link 100 to yoke lever 72. The opposite end of yoke lever 72 is pivotally connected to a bracket 101 rising from the motor mounting plate 58. Yoke lever 72 loosely encircles shifter ring 71 and includes a pair of slots 102 at opposite sides, loosely confining the opposed pins 103 which project outwardly from ring 71. Rotation of hand wheel 53 imparts rotary motion to the worm wheel and lever 98; thus, raising or lowering yoke lever 72 to change the pitch of the pulley system. As noted earlier, the speed change adjustment is carried out while the motor is running in order to allow the belt to shift as the spacing of the pulley flanges is changed.

The speed indicator or pointer 54 previously noted, comprises a pointer support 104 attached to an end of rock shaft 96. The pointer 54 is carried by a stem which projects through a slot 105 in the top wall of the column and speed indicator plate 55. Pointer 54 is double ended and thus shifts with respect to the two sets of speed graduations in accordance with the rotation of hand wheel 53. In setting up the machine for a desired spindle speed, the operator shifts range selector lever 56 to the high or low range, whichever includes the desired speed, then rotates hand wheel 53 so as to align pointer 54 with the desired speed as denoted on the high or low range of the indicator plate. The variable pitch pulley drive of this invention thus provides a driving connection from the motor 31, through the shaft assembly 67 (FIGURE 1) to the timer gear 78 and timer belt 80. The timer belt establishes a driving connection with the spindle transmission which is mounted in the turret housing 82 to rotate the spindle 30 at the selected speed, as disclosed in detail in the aforesaid Patent No. 2,963,944. The spindle transmission does not form a part of the present invention and therefore is not described in detail.

Having described my invention, I claim:

1. In a variable pitch driving system for a milling machine having a column, said system including variable pitch pulleys mounted for rotation about respective vertical axes, said pulleys being shiftable relative to one another along said vertical axes, and a belt connecting said pulleys, speed selector means for adjusting the pitch of said pulley system comprising, shiftable means connected to said pulleys for changing the pitch thereof, a speed selector shaft journalled in said column for rotation about a generally horizontal axis, manual means for rotating said shaft, a worm mounted on the speed selector shaft, a rock shaft journalled in said column for rotation about a generally horizontal axis, a worm wheel keyed to said rock shaft, said worm wheel meshing with said worm, whereby the rock shaft is rotated in response to rotation of the speed selector shaft and worm, said worm and worm wheel locking the rock shaft against rotary motion in a selected speed setting, a rock shaft lever keyed to the rock shaft, said rock shaft lever projecting from the rock shaft along a generally horizontal axis when the speed selector means is adjusted to an intermediate speed position, a yoke lever disposed along a generally horizontal axis and having one end pivotally connected to the column, a rigid link pivotally connecting the opposite end of said yoke lever to said rock shaft lever, said rigid link being disposed along a generally vertical axis, means connecting said yoke lever to the shiftable means of said variable pitch pulley, and a speed indicator mounted on said rock shaft, said speed selector shaft upon being rotated, causing rotation of said rock shaft and shifting the shiftable means of the variable pitch pulleys in a direction to increase or decrease the pitch thereof, said indicator denoting the speed provided by said pulley system in response to rotation of the speed selector shaft.

2. In a variable pitch driving system for a milling machine having a column, said system including variable pitch pulleys which are shiftable relative to one another and a belt connecting said pulleys, speed selector means for adjusting the pitch of said pulley system comprising, shiftable means connected to said pulleys for changing the pitch thereof, a speed selector shaft rotatably journalled in said column, a hand wheel keyed to said shaft for rotating the selector shaft, a worm mounted on said selector shaft, a rock shaft rotatably journalled in said column, said rock shaft being disposed beneath said selector shaft substantially at right angles thereto, a worm wheel keyed to said rock shaft and meshing with the worm of the selector shaft, a lever keyed to the rock shaft, a yoke lever having one end pivotally connected to the column, a rigid link pivotally connecting the opposite end of the yoke lever to the rock shaft lever, means connecting said yoke lever at an intermediate point thereof to the shiftable means of the variable pitch pulley, a speed indicator projecting outwardly from said rock shaft, said column having a slot formed therein, said speed indicator projecting outwardly through said slot, and speed indicating means on said column adjacent said slot, said speed selector shaft upon being rotated, causing rotation of the rock shaft at a reduced ratio and shifting the shiftable means of the variable pitch pulleys in a direction to increase or decrease the pitch thereof, said indicator denoting the speed provided by said pulley system in response to the rotation of the speed selector shaft.

References Cited in the file of this patent

UNITED STATES PATENTS

| | | |
|---|---|---|
| 1,926,269 | Easter | Sept. 12, 1933 |
| 2,277,004 | Reeves | Mar. 17, 1942 |

FOREIGN PATENTS

| | | |
|---|---|---|
| 840,511 | Germany | June 3, 1952 |